United States Patent
Taguchi et al.

(10) Patent No.: US 7,431,329 B2
(45) Date of Patent: Oct. 7, 2008

(54) AIR BAG DEVICE

(75) Inventors: Seigo Taguchi, Hiroshima (JP);
Katsuyoshi Ishigame, Hiroshima (JP);
Tsutomu Sugahara, Hiroshima (JP);
Naoki Yamaji, Osaka (JP); Hidetaka Azuma, Kyoto (JP)

(73) Assignees: Mazda Motor Corporation, Hiroshima (JP); Ashimori Industry Co., Ltd., Osaka (JP)

( * ) Notice: Subject to any disclaimer, the term of this patent is extended or adjusted under 35 U.S.C. 154(b) by 308 days.

(21) Appl. No.: 11/165,222

(22) Filed: Jun. 24, 2005

(65) Prior Publication Data

US 2006/0001244 A1    Jan. 5, 2006

(30) Foreign Application Priority Data

Jun. 28, 2004 (JP) .............................. 2004-190124
Jun. 28, 2004 (JP) .............................. 2004-190125
Jun. 28, 2004 (JP) .............................. 2004-190126

(51) Int. Cl.
B60R 21/26 (2006.01)

(52) U.S. Cl. ...................................... 280/729; 280/740

(58) Field of Classification Search ................. 280/729, 280/740, 730.1, 730.2, 743.1, 743.2, 732
See application file for complete search history.

(56) References Cited

U.S. PATENT DOCUMENTS

| | | | | |
|---|---|---|---|---|
| 5,586,782 A * | 12/1996 | Zimmerman et al. | ...... | 280/730.2 |
| 5,845,935 A * | 12/1998 | Enders et al. | ............ | 280/743.2 |
| 6,062,594 A * | 5/2000 | Asano et al. | ............. | 280/730.2 |
| 6,065,772 A | 5/2000 | Yamamoto et al. | | |
| 6,213,499 B1 * | 4/2001 | Khoudari et al. | ......... | 280/730.2 |
| 6,270,113 B1 * | 8/2001 | Wipasuramonton et al. | ....................... | 280/730.2 |
| 6,561,541 B2 * | 5/2003 | Vendely et al. | .......... | 280/730.2 |
| 2003/0168836 A1 * | 9/2003 | Sato et al. | ................ | 280/730.2 |
| 2004/0124615 A1 * | 7/2004 | Tanase et al. | ............ | 280/730.2 |
| 2005/0248132 A1 * | 11/2005 | Wheelwright | ............... | 280/729 |
| 2006/0022441 A1 * | 2/2006 | Hayashi et al. | .......... | 280/730.2 |
| 2006/0175809 A1 * | 8/2006 | Yamaji et al. | ............... | 280/729 |
| 2007/0164546 A1 * | 7/2007 | Kai et al. | ................. | 280/730.2 |

FOREIGN PATENT DOCUMENTS

| JP | 10-067297 A | 3/1998 |
|---|---|---|
| JP | 10-100827 A | 4/1998 |

* cited by examiner

*Primary Examiner*—Kevin Hurley
*Assistant Examiner*—Drew J. Brown
(74) *Attorney, Agent, or Firm*—Sughrue Mion, PLLC

(57) ABSTRACT

Expansion of an air bag can be smoothly effected even in a small space by controlling the air bag in thickness and introduction of the gas for expansion, and the protection of an occupant can be rapidly implemented with a relatively small volume of the gas. An air bag device comprises a first air chamber 12 for protection of the chest or the waist of an occupant, a second air chamber 14 for protection of the head of the occupant, and a lower portion of the diffuser bag 30 interposed therebetween for portioning out gas from an inflator 20, wherein the second air chamber 14 has a first tether 50 forming a gas passage 14a for guiding gas jetted from gas outlets of the lower portion of the diffuser bag 30 into the second air chamber 14 so as to go around the tether of a head protection region of an air bag 1, from the back side thereof toward the front side thereof, and has a second tether 52 for forming a gap provided at the lower end of the first tether 50 in the vicinity of the gas outlets, for letting a portion of the gas escape into a front part of the second air chamber 14.

8 Claims, 3 Drawing Sheets

AIR BAG DEVICE

FIELD OF THE INVENTION

The invention relates to an air bag device incorporating an air bag comprising a first air chamber provided with an inflator, for protection of the waist or the chest of an occupant, and a second air chamber into which gas of the inflator is guided from the first air chamber, for protection of the head of the occupant, and in particular, to an air bag device capable of being expanded in a limited space with ease, and guiding the gas to a head protection part of the second air chamber with ease.

BACKGROUND OF THE INVENTION

While use has been made of an air bag for protection of an occupant at the time of a side collision, it has been known that the waist of an occupant sitting down first comes into collision with a car's door to be then subjected to an impact, and the chest of the occupant subsequently comes into collision with the car's door.

A conventional air bag device for use as a countermeasure against a side collision used to be structured such that an air bag in its entirety is evenly expanded, however, when trying to sufficiently absorb energy due to the side collision, such a structure as described has turned out inadequate particularly for protection of only the waist, first and foremost, having therefore failed to provide a satisfactory countermeasure against the side collision.

There has been known an air bag device for use as a countermeasure against a side collision (refer to Japanese Patent No. 2933894) developed under the circumstances, incorporating an air bag having two air chambers integral with each other, comprising a lower air bag for protecting the waist of an occupant, on a side of a car body, and an upper air bag for protecting the chest of an occupant, on the side of a car body, wherein a partition wall provided between the upper air bag and the lower air bag has a pressure control valve interposed therebetween, thereby causing the lower air bag to be expanded ahead of the upper air bag.

With the above-described air bag device against the side collision, the air bag expanded in a vertical direction from seat cushion side parts is first inflated up to the height of the waist of the occupant, thereby protecting the waist of the occupant, and continues to be deployed up to the height of the chest of the occupant.

However, if the protection of the head, as well as the waist and chest of the occupant is taken into consideration, when using the air bag against the side collision, while there is, for example, the need for a portion of the air bag, for protecting the waist, reaching a peak pressure before the elapse of 4 ms from expansion of the air bag against the side collision, and thereafter, being quickly reduced in pressure, thereby mitigating a rebound force of the air bag against the side collision, applied to the waist, a portion of the air bag, for protecting the head, needs to keep pressure at a peak value even after the elapse of 12 ms to thereby securely hold the head, so that, in practice, it is necessary not only to differentiate simply in timing for expansion between the respective portions of the air bag against the side collision, but also to differentiate in pressures after the expansion between the respective portions of the air bag, for protecting respective parts of the body of the occupant. Nevertheless, with the conventional air bag device, it is impossible to differentiate in pressure between the upper air bag, and the lower air bag.

Accordingly, with the structure described, there is a problem in that the pressures of the respective portions of the air bag, after the expansion thereof, cannot be optimally adjusted so as to correspond to the respective parts of the body of the occupant.

Accordingly, there has been proposed an air bag device (refer to JP 10-100827A) wherein a partition wall having a communicating part is provided inside a bag-like body of the air bag device, and while the bag-like body is partitioned into first and second chambers, that is, upper and lower ones, there is provided a check valve structured such that an edge of a thin film, at both ends thereof, is fixedly attached to the upper face of the partition wall in such a way as to cover the communicating part, and when gas of the lower chamber flows into the upper chamber, a midpoint part of the check valve is bulged upward in a arch-like state owing to pressure of the gas flowing from the lower chamber into the upper chamber through the communicating part, thereby releasing the check valve so as to allow the gas of the lower chamber to flow into the upper chamber, however, upon addition of outflow pressure of the gas from the upper chamber to the lower chamber, the communicating part is blocked by the midpoint part of the check valve, thereby blocking outflow of the gas from the upper chamber to the lower chamber.

With the air bag device described as above, however, there are the needs for separately preparing the check valve, and attaching it to the partition wall in size large enough to allow the check valve to be attached thereto, causing problems such as an increase in a component count, inability to secure the communicating part in a shape requiring a small gas passage, and so forth.

Now, with the conventional air bag, the upper chamber is formed simply in a bag-like shape, so that it is necessary to cause a large volume of gas to flow into the upper chamber in short time in order to ensure protection of the head of the occupant because the gas from the inflator is diffused throughout the upper chamber when the air bag is expanded. Further, in case that space between the occupant and a door trim, or sidewall is narrow, a gas stream from the portion of the air bag, for protecting the chest (or the waist) of the occupant, to the portion thereof, for protecting the head of the occupant is restricted at the time when the air bag is expanded, so that there is a danger of not only the deployment of the air bag around the head is delayed, but also the portions of the air bag are damaged, or inflicting a direct blow on the occupant, owing to rise in pressure, due to constriction of the gas stream.

SUMMARY OF THE INVENTION

The invention has been developed to solve those problems described as above, and it is therefore an object of the invention to let an air bag at the time of expansion smoothly deploy from the chest to the head of an occupant even if space between the occupant and a door trim is narrow, and to cause a head protection region of a second air chamber which is an upper air chamber, to first expand upon collision with a relatively small volume of gas, thereby enabling the head of the occupant to be effectively protected while preventing gas pressure from excessively rising even if the air bag is constricted between the occupant and the door trim, that is, mitigating pressure in a first air chamber which is a lower air chamber at the time of expansion, so that the occupant can be safely and reliably protected.

Further, a second object of the invention is to obtain an air bag device having those functions described with simple structure.

In accordance with a first invention, there is provided an air bag device characterized in comprising a first air chamber for protection of the chest or the waist of an occupant, a second air chamber for protection of the head of the occupant, and a diffuser interposed therebetween, having a first communicating hole, and a second communicating hole, for portioning out gas from an inflator to the second air chamber, and the first air chamber, respectively, wherein the second air chamber has a first tether for guiding gas jetted from gas outlets of the diffuser into the second air chamber so as to go around the tether of a head protection region of an air bag, from the back side thereof toward the front side thereof, and has a gap provided at the lower end of the first tether in the vicinity of the gas outlets, for letting a portion of the gas escape into a front part of the second air chamber.

In accordance with a second invention, with the air bag device described in the first invention, it is characterized in that the first tether be preferably formed by sewing together base clothes forming the second air chamber, on the top face side, and rear face side thereof, respectively, so as to be oriented upward in the second air chamber from the vicinity of the gas outlets of the diffuser.

In accordance with a third invention, with the air bag device described in the first or second invention, it is characterized in that the gap for letting the portion of the gas escape into the front part of the second air chamber is preferably formed by the first tether and a second tether formed by sewing together the base clothes forming the second air chamber, on the top face side, and rear face side thereof, respectively, at a position below the first tether with a predetermined interval provided therebetween.

In accordance with a fourth invention, with the air bag device described in any of the first to third inventions, it is characterized in that a tether is preferably provided in a shoulder protection region, inside the second air chamber, such that the shoulder protection region of the air bag, at the time of expansion, is controlled to be smaller in thickness than the head protection region.

In accordance with a fifth invention, with the air bag device described in the first invention, it is characterized in that when pressure inside the diffuser becomes lower than pressure inside the second air chamber, the first communicating hole for portioning out the gas from the inflator into the second air chamber are preferably closed owing to a difference in pressure therebetween.

In accordance with a sixth invention, there is provided an air bag device characterized in comprising a first air chamber for protection of the chest or the waist of an occupant, a second air chamber for protection of the head of the occupant, and a diffuser interposed therebetween, having a first communicating hole, and a second communicating hole, for portioning out gas from an inflator to the second air chamber, and the first air chamber, respectively, wherein the second air chamber has a first tether for guiding gas jetted from gas outlets of the diffuser into the second air chamber so as to go around the tether of a head protection region of an air bag, from the back side thereof toward the front side thereof, and has a shoulder protection region continuous from the head protection region, joined to the first air chamber, as well as second tethers for controlling the thickness of the shoulder protection region.

In accordance with a seventh invention, with the air bag device described in the sixth invention, it is characterized in that at least one of the second tethers is preferably disposed at a position adjacent to the gas outlets of the diffuser of the second air chamber, away from the first tether with a gap provided therebetween, enabling the gas to flow into the shoulder protection region through the gap.

In accordance with an eighth invention, with the air bag device described in the seventh invention, it is characterized in that the at least one of the second tethers is preferably formed by sewing together base clothes, on the top face side, and rear face side of the air bag, respectively, into the shape of a circle.

In accordance with a ninth invention, with the air bag device described in any of the sixth to eighth inventions, it is characterized in that when pressure inside the diffuser becomes lower than pressure inside the second air chamber, the first communicating hole for portioning out the gas from the inflator into the second air chamber is preferably closed owing to a difference in pressure therebetween.

In accordance with a tenth invention, there is provided an air bag device characterized in comprising a first air chamber for protection of the chest or the waist of an occupant, a second air chamber for protection of the head of the occupant, and a diffuser in a bag-like shape, interposed therebetween, having a first communicating hole, and a second communicating hole, for portioning out gas from an inflator to the second air chamber, and the first air chamber, respectively, wherein the second air chamber has a first tether for guiding gas jetted from gas outlets of the diffuser through the first communicating hole into the second air chamber so as to go around the tether of a head protection region of an air bag, from the back side thereof toward the front side thereof while the second communicating hole is formed so as to be smaller in opening area than the first communicating hole, and vent holes are formed in the first air chamber.

In accordance with an eleventh invention, with the air bag device described in the tenth invention, it is characterized in that the second air chamber is preferably provided in a part of the air bag, above the diffuser, and the first air chamber is preferably provided in a part of the air bag, in front of the diffuser.

In accordance with a twelfth invention, with the air bag device described in the tenth or eleventh invention, it is characterized in that the vent holes of the first air chamber are preferably provided in the vicinity of an edge of the chamber.

(Operation)

1. The second air chamber for protection of the head of the occupant, according to the invention, has the first tether for guiding the gas jetted from the gas outlets of the diffuser into the second air chamber so as to go around the tether of the head protection region of the air bag from the back side thereof toward the front side thereof, so that the gas expanding causes portions of the second air chamber of the air bag to be sequentially expanded frontward from behind the head of the occupant along the first tether. Further, the thickness of the air bag is limited by the tether, and the head protection region is caused to expand reliably with a relatively small volume of the gas.

2. The gap for letting the portion of the gas escape is formed at the lower end of the first tether in the vicinity of the gas outlets, and due to outflow of the gas through the gap, gas pressure is prevented from excessively rising even if the air bag is constricted between the occupant and a sidewall (the door trim).

3. When the pressure inside the diffuser becomes lower than the pressure inside the second air chamber during expansion of the air bag, the first communicating hole is closed owing to the difference in pressure therebetween, so that cutoff between the first and second air chambers is effected, thereby enabling the second air chamber to maintain the pressure thereof. That is, the first and second air chambers are set to be air chambers having pressure characteristics differing from each other, thereby enabling the head to be protected with reliability.

(Effects of the Invention)

The invention can have the following advantageous effects.

1. At the time of deploying the air bag, the air bag is deployed starting from a portion thereof, behind the head of the occupant, with the first tether as a guide, so that deploying the air bag is insusceptible to space between the occupant and the sidewall, and can be rapidly implemented with a relatively small volume of the gas at a low pressure. Further, even if a gas flow path is constricted between the occupant and the sidewall, it is possible to prevent the pressure from abnormally rising by letting the portion of the gas escape into the front part of the second air chamber.

2. At the time of deploying the air bag, the gas rises upward through a tubular passage formed by the first tether and then flow into the head protection region of the air bag, from the back side thereof toward the front side thereof, so that the head protection region can be deployed rapidly with a relatively small volume of the gas, thereby achieving protection of the head. Further, when fabricating the air bag by sewing, the tethers also are formed by sewing together the base clothes forming the air bag, on the top face side, and rear face side thereof, respectively, so that guide paths of the gas can be formed concurrently with the sewing of the air bag, thereby cutting down fabrication cost.

3. Since there exists the gap between the gas outlets of the diffuser in the second air chamber, and the lower end of the first tether, it is possible to let a portion of the gas escape through the gap even if the air bag is constricted between the occupant and the door trim, so that there is no danger of the gas in an excessively high pressure condition due to such constriction causing the head to be subjected to a direct impact, or the air bag to be damaged.

4. Since the shoulder protection region of the air bag, at the time of expansion, is limited by the tethers to be smaller in thickness than the head protection region, even if the space between the occupant and the sidewall is narrow, the gas for expansion, from the inflator, can be smoothly sent to the head protection region regardless of the space between the occupant and the sidewall 5. Since the diffuser can functions as a valve, even a narrow gas flow path can be provided with a valve function, and the component count can be reduced, so that cost can be cut down.

6. At the time of deploying the air bag, a greater volume of the gas is caused to flow into the second air chamber, and the gas rises upward through the tubular passage formed by the first tether to flow so as to go around the tether of the head protection region, from the back side thereof toward the front side thereof, so that the air bag is deployed starting from the portion thereof, behind the head of the occupant, with the first tether as the guide thereby enabling the head of the occupant to be protected rapidly and with reliability. Further, by letting the pressure inside the second air chamber escape at the time of deploying the air bag, an impact to the occupant can be absorbed, thereby preventing the air bag from inflicting an injury to the occupant.

BRIEF DESCRIPTION OF THE DRAWINGS

FIGS. 3A to 3C are sectional views of the partition unit shown in FIG. 1, as seen in a plane orthogonal to the plane of FIG. 1, in which FIG. 3A shows a condition where pressure inside the lower air chamber is higher than that in the upper air chamber, FIG. 3B shows a condition of equilibrium in pressure between the upper air chamber and the lower air chamber, and FIG. 3C shows a condition where the pressure in the upper air chamber is higher than that in the lower air chamber.

PREFERRED EMBODIMENT OF THE INVENTION

An air bag device against a side collision as one embodiment of an air bag device according to the invention is described hereinafter with reference to the accompanying drawings.

Figure 1:
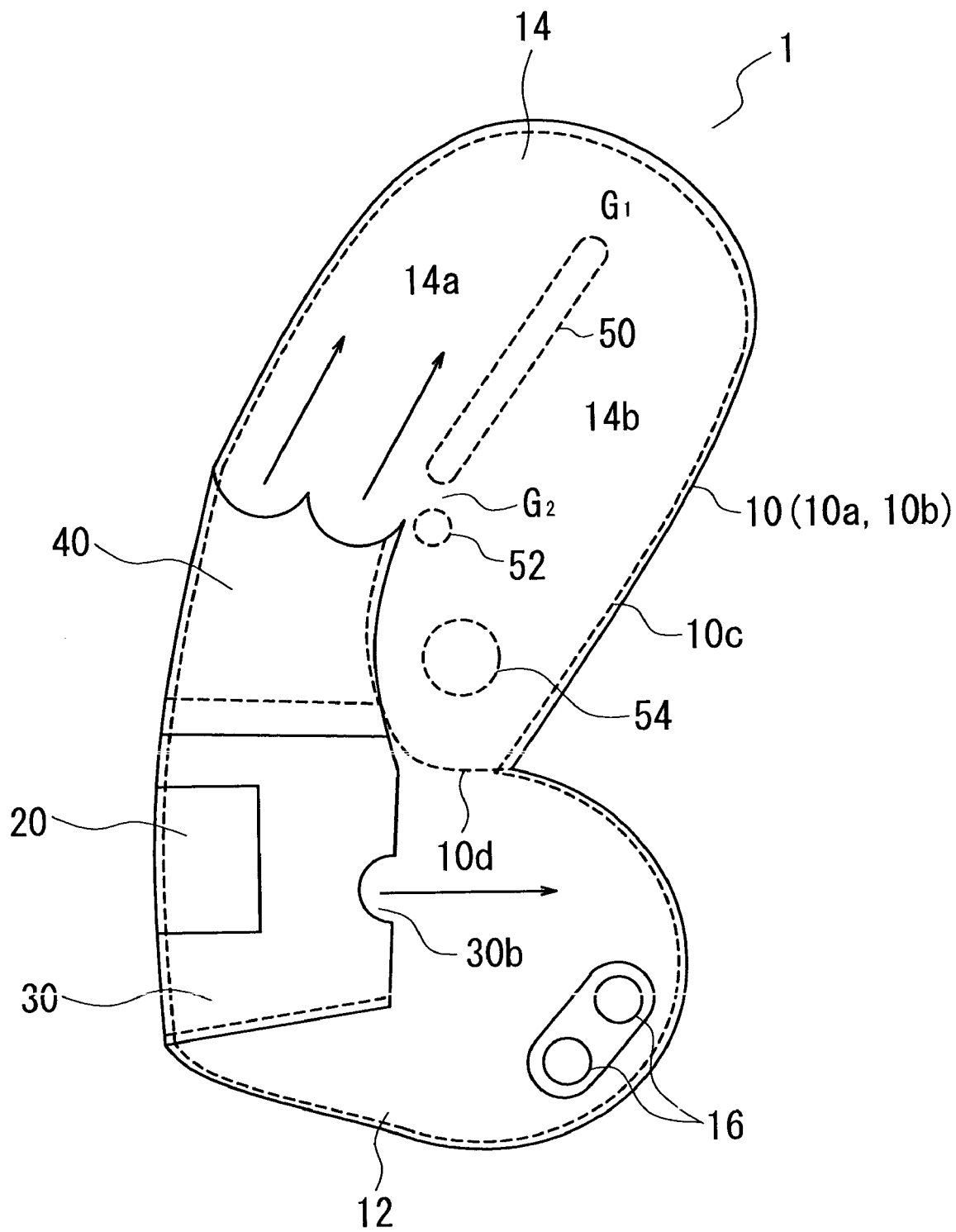
FIG. 1 is a schematic sectional view broadly showing the whole makeup of one embodiment of an air bag device according to the invention.

FIG. 1 is a schematic sectional view broadly showing the whole makeup of the air bag device against the side collision.

As shown in the figure, an air bag 10 of the air bag device 1 is formed by sewing together base clothes 10a, 10b, on the top face side, and rear face side of the air bag 10, respectively, at a seam 10c along the entire periphery thereof, each being made of, for example, a synthetic fabric such as polyamide, polyester, and so forth, with a resin coating applied thereto, for common use in air bags. Further, the air bag 10 is divided along another seam 10d branching off from the seam 10c, at which the base clothes 10a, 10b, on the front, and back sides of the air bag 10, respectively, are sewn together, into a lower air chamber 12 for protection of the chest (or the waist) of an occupant as a first air chamber extending laterally, and an upper air chamber 14 for protection of the head of the occupant, as a second air chamber narrower in width than the first air chamber, and extending longitudinally.

A lower portion of the diffuser bag 30 formed by doubling a piece of a base cloth with a predetermined length and width, and pinching both edges thereof between the base clothes 10a, 10b to be subsequently sewn together is disposed on an edge of the lower air chamber 12, on the left-hand side in FIG. 1. The lower portion of the diffuser bag 30 is preferably made of a cloth higher in heat resistance than the base clothes 10a, 10b, and has a second communicating hole 30b for portioning out gas from an inflator 20 to the lower air chamber 12. The second communicating hole 30b is smaller in opening area than the first communicating hole 40e, and when the gas is jetted out from the inflator 20 disposed inside the lower portion of the diffuser bag 30, the lower portion of the diffuser bag 30 rectifies at least a portion of a jet stream of the gas. Further, with the present embodiment, two vent holes (exhaust outlets) 16 are provided in the vicinity of an edge of the lower air chamber 12, on the right-hand side in FIG. 1. The exhaust outlets 16 are for letting pressure inside the lower air chamber 12 escape at the time of expansion thereof, thereby absorbing an impact to the occupant.

Inside the upper air chamber 14, there is provided a head tether 50 as a first tether, so as to be substantially parallel with an edge of the upper air chamber 14, on the left-hand side in FIG. 1. As shown in the figure, the first tether 50 is formed by sewing together the base clothes forming the air bag, on the top face side, and rear face side thereof, respectively, into the shape of, for example, a prolate ellipsoid, and a gap G1 serving as a gas flow path is formed between the upper edge of the first tether 50, and the upper edge of the upper air chamber 14. Further, a tubular passage 14*a* extending upward from a part of the upper air chamber 14, communicating to the lower air chamber 12, along an edge of the air bag 10, on the left-hand side in FIG. 1, is formed by the first tether 50. Furthermore, on the lower edge side of the first tether 50, that is, in the vicinity of an upper portion of the diffuser bag 40 of the lower portion of the diffuser bag 30, there is provided a second tether 52 formed similarly to the case of the first tether 50 by sewing together the base clothes, on the top face side, and rear face side of the air bag, respectively, into the shape of, for example, a circle, in this case, away from the first tether 50 with a gap G2 provided therebetween. The second tether 52 functions as a by-pass port of pressurized gas in the case where space between the occupant and a door trim is narrow, and the air bag in the course of expansion is constricted. As a result, it is possible to ward off the head of the occupant being subjected to a direct blow by the pressurized gas.

In a shoulder protection region, situated obliquely below the first tether 50, and on the right-hand side in FIG. 1, inside the upper air chamber 14, there is provided a third tether 54 formed also by sewing together the base clothes forming the second air chamber, on the top face side, and rear face side thereof, into the shape of, for example, a circle. The third tether 54 is for controlling the thickness of a portion of the air bag, in the shoulder protection region. More specifically, by controlling a portion of the air bag, in the shoulder protection region, to a small thickness, the air bag is allowed to smoothly deploy even if the space between the occupant and the door trim is narrow, or the gas jetted out from the inflator is relatively small in volume.

Figure 2:
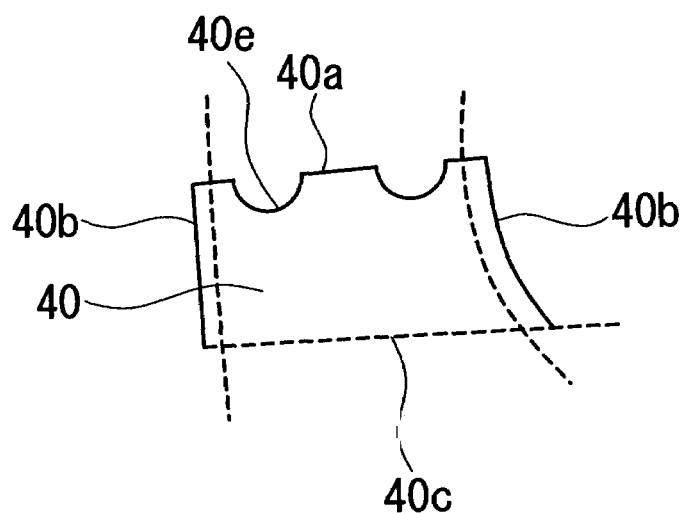
FIG. 2 is an enlarged view of a partition unit shown in FIG. 1.

FIG. 2 is an enlarged view of the upper portion of the diffuser bag 40 shown in FIG. 1.

As shown in the figure, in this part, there is provided the upper portion of the diffuser bag 40 formed by folding back a piece of base cloth with a predetermined length and width, and causing a folded-back part 40*a* thereof to be oriented toward the upper side of the air bag, that is, in a direction opposite from the inflator 20, thereby sewing a lower edge 40*c* thereof, and both side edges 40*b*, 40*b*, thereof, together with the respective base clothes 10*a*, 10*b*, on the top face side, and rear face side of the air bag 10.

In the upper edge portion of the folded-back part of the upper portion of the diffuser bag 40, there are formed communicating holes (gas outlet) 40*e* as described later (refer to, for example, FIG. 3A), for guiding the gas from the inflator 20 into the upper air chamber 14, two of the gas outlet being arranged side by side in the case of the present embodiment.

FIG. 3 is a sectional view of the partition unit shown in FIG. 1, as seen in a plane orthogonal to the plane of FIG. 1.

Figure 3A:
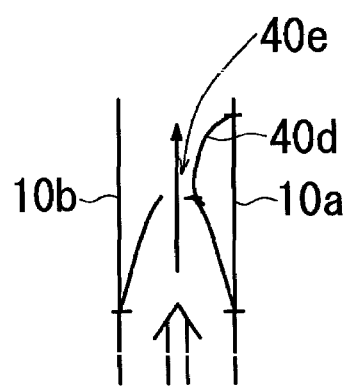

FIG. 3A shows a condition where pressure inside the lower air chamber 12 is higher than that in the upper air chamber 14 at the outset of actuation of the inflator 20, and in this condition, a force causing partition faces to expand toward the outer side thereof comes into action owing to the pressure on the side of the lower air chamber 12, so that the gas outlet 40*e* of the upper portion of the diffuser bag 40 are opened, thereby causing the gas to flow from the lower air chamber 12 toward the upper air chamber 14.

Figure 3B:
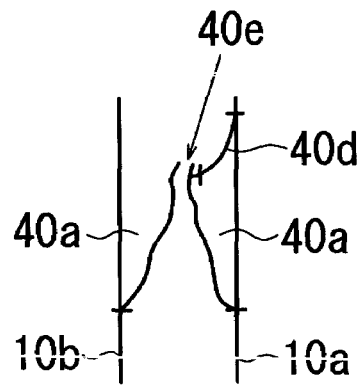

FIG. 3B shows a condition of equilibrium in pressure between the upper air chamber 14 and the lower air chamber 12 and in this condition, pressure on the inner face of a partition wall, and pressure on the outer face of the same are kept in equilibrium, so that there occurs no movement of the gas through the gas outlet 40*e*. This condition exists when, for example, the inflator 20 is not actuated.

Figure 3C:
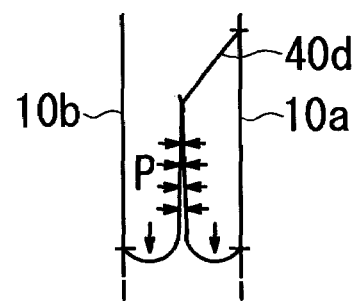

FIG. 3C shows a condition where after the pressure inside the lower air chamber has reached the highest level, the pressure thereof has abruptly dropped, thereby causing the pressure in the upper air chamber to become higher than that in the lower air chamber. In this condition, the partition faces of the upper portion of the diffuser bag 40 are subjected to pressure applied from the outer side thereof owing to the pressure on the side of the upper air chamber 14, so that the partition faces are brought into contact with one another, and consequently, the gas outlet 40*e* are closed, thereby effecting cutoff between the air chambers 12, 14. That is, the upper portion of the diffuser bag 40 functions as a check valve.

Further, reference numeral 40*d* denotes a tether binding the upper edge portion of the folded-back part of the upper portion of the diffuser bag 40 to one of the base clothes making up the air bag 10. Since the tether 40*d* fulfills a function of preventing the upper portion of the diffuser bag from flipping over when the pressure in the upper air chamber becomes higher than that in the lower air chamber, the tether 40*d* can be dispensed with in the case of the present embodiment wherein all parts of the upper portion of the diffuser bag 40, except the folded-back part thereof, are sewn to the base clothes making up the air bag 10.

Now, there will be described hereinafter operation of the air bag device 1 against the side collision, according to the present embodiment of the invention.

The air bag device 1 against the side collision, according to the present embodiment, is held at a suitable position such as within a seat cushion material, and so forth, and when an impact due to a collision is added to the side of a car, an impact sensor detects the impact, thereby sending an activation signal for causing the air bag to deploy to the inflator. In response to the activation signal, the inflator jets out the gas.

At this point in time, the gas jetted out from the inflator proceeds toward the upper air chamber 14 after rectification by the lower portion of the diffuser bag 30 to be subsequently guided or jetted out into the upper air chamber 14 through the first communicating hole (gas outlet) 40*e*, provided in the upper portion of the diffuser bag 40, while a portion of the gas is jetted out into the lower air chamber 12 through the second communicating hole (second gas outlet) 30*b*, smaller than the first 40*e*, thereby expanding the lower air chamber 12. The gas guided into the upper air chamber 14 rises in the tubular air chamber 14*a* formed by the first tether 50, serving as a relatively narrow gas passage, toward the head protection region, and the air bag rapidly expands so as to wrap around the head of the occupant from the back side of the head toward the front side thereof, thereby protecting the head by supporting the same in a stable condition. Further, since the third tether 54 is provided in the shoulder protection region, the portion of the air bag, in that region, is controlled so as to have a thickness smaller than the head protection region. Accordingly, even if the space between the occupant, and the door trim, or the sidewall is narrow, it is possible to rapidly expand the head protection region inside the air bag to be deployed with a relatively small volume of the gas for expansion, and also to smoothly deploy the upper air chamber 14 in its entirety.

Further, in cases where the space between the occupant, and the door trim, or the sidewall is particularly narrow, the air bag expanding to be deployed can be constricted, thereby causing the pressure of the gas for expansion to excessively rise, however, with the present embodiment, since the gap G2 is provided between the lower end of the first tether 50, and the upper end of the second tether 52, it is possible to let a portion of the gas for expansion escape into a part of the second air chamber, in front of the first tether 50, through the gap G2, so that the pressure of the gas for expansion can be prevented from abnormally rising even in such a case, and damaging parts of the air bag, or subjecting the occupant to a direct impact.

Meanwhile, the exhaust outlets 16 are provided in the vicinity of the edge of the lower air chamber 12 of the air bag 10, on a side of the lower air chamber 12, opposite from the inflator 20, that is, at the front edge of the lower air chamber 12, and a jet stream of the gas from the inflator 20 is caused to flow out to outside through the exhaust outlets 16, thereby adjusting the pressure inside the lower air chamber 12 so as to be able to effectively protect the waist (chest) of the occupant. This is intended to abruptly lower the pressure inside the lower air chamber 12, caused by jetting of the gas from the inflator 20, thereby rapidly mitigating rebound force against the waist of the occupant for effecting protection of the waist (chest).

On the other hand, on the side of the upper air chamber 14, since the pressure inside the lower air chamber is higher than that inside the upper air chamber at the outset of actuation of the inflator 20, and the gas is caused to flow in by the agency of the diffuser, a portion of a jet stream of the gas from the inflator 20 is guided into the upper air chamber 14 through the gas outlet 40e of the upper portion of the diffuser bag 40, as shown in FIG. 3A, thereby causing the upper air chamber 14 to undergo expansion.

As described in the foregoing, the gas guided into the upper air chamber 14 flows first upward along the tubular passage 14a of the upper air chamber 14 to pass through the gap G1 between the first tether 50, and the upper edge of the upper air chamber 14, and subsequently flows in such a way as to wrap around the head of the occupant from the back side of the head toward the front side thereof, continuing to flow downward from the front side. Accordingly, portions of the upper air chamber 14 undergo expansion in sequence, starting from portions thereof, adjacent to the lower air chamber 12, from the backside to the front side and along the arms of the occupant, followed by portions thereof along the shoulder, and then, along the temple of occupant. In other words, upon occurrence of a side collision, the waist of the occupant is first protected, and subsequently, a protection region of the air bag is deployed to the portions thereof, along the arms of the occupant, the shoulder, and then, the temple of occupant, in that order, so that the waist, the arms, and the head of the occupant can be secured in that order, thereby implementing the safest protection thereof.

Meanwhile, the pressure of the gas guided into the upper air chamber 14 is acting on the upper portion of the diffuser bag 40 from the outside thereof, and the pressure of the gas, from the side of the lower air chamber 12, is acting on the upper portion of the diffuser bag 40 from the inside thereof, so that as long as there continues the condition where the pressure inside the lower air chamber 12 is higher than that in the upper air chamber 14 as described hereinbefore, or as long as the gas from the inflator 20 is rectified by the lower portion of the diffuser bag 30 to be subsequently flow in, the gas continues to flow into the upper air chamber 14 from the side of the lower air chamber 12.

When the pressure of the gas inside the lower air chamber 12 in this condition drops, and the jet stream of the gas from the inflator 20 stops flowing, there occurs reversal in relationship between respective gas pressures acting on the inside and outside of the partition unit, that is, the pressure acting on the partition unit from the outside thereof, in other words, from the inside of the upper air chamber, becomes relatively higher than the pressure acting on a face of the partition unit, on the inside thereof, in other words, the pressure inside the lower air chamber 12, so that the interior of the partition unit is crumpled up, thereby causing the partition faces thereof to be brought into contact with one another, and the gas outlet 40e to be closed (refer to FIG. 3C).

As a result, the pressure inside the upper air chamber 14 is kept substantially at a predetermined highest value, so that it is possible to sufficiently protect the head that is lighter than the waist (or chest), and needs therefore to be held in a secured condition for a long duration.

Figure 4:
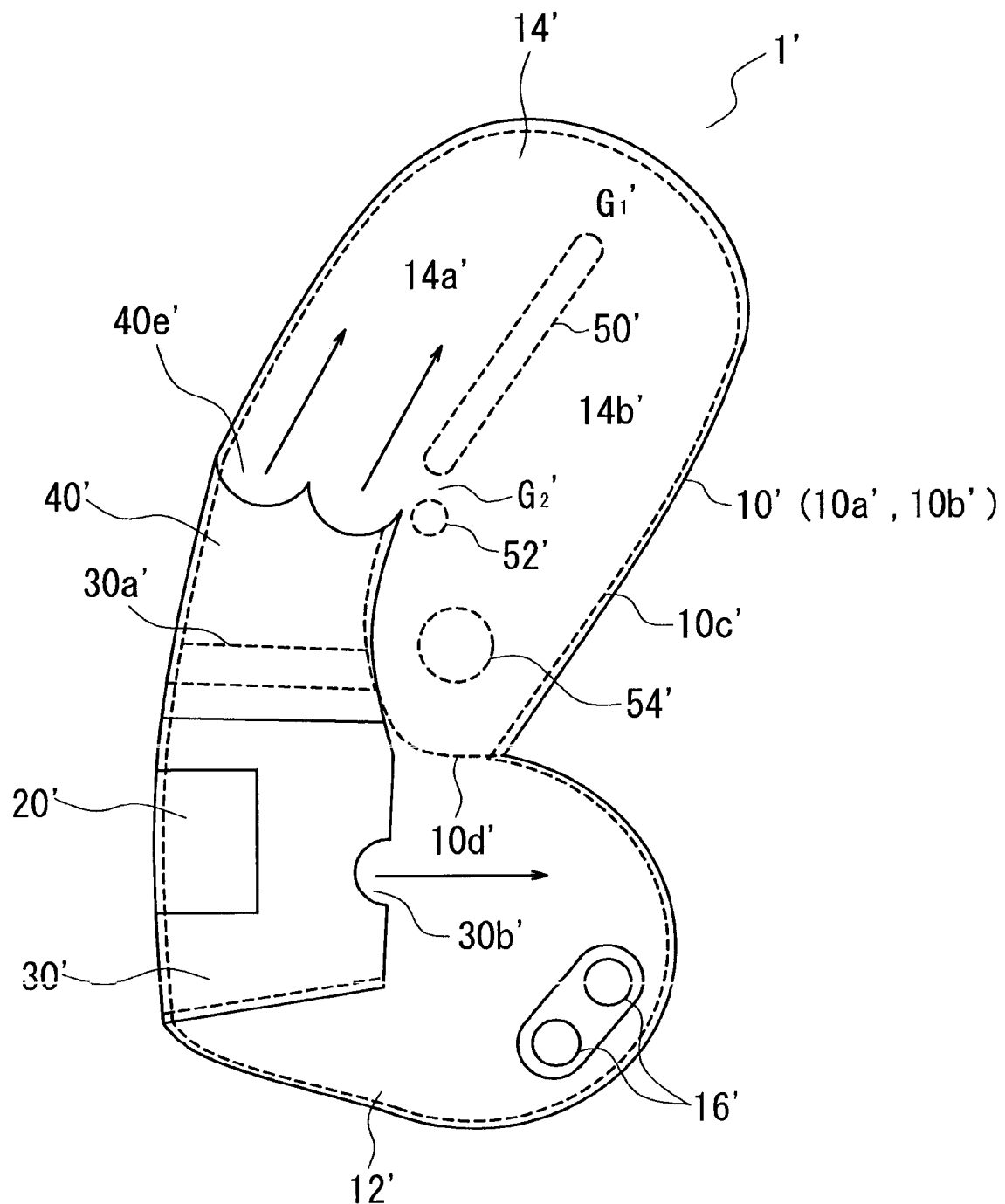
FIG. 4 is a schematic sectional view broadly showing the whole makeup of another embodiment of an air bag device according to the invention.

FIG. 4 is a schematic sectional view similar to FIG. 1, broadly showing the whole makeup of another embodiment of an air bag device against a side collision, according to the invention. The air bag device against the side collision, according to the present embodiment, differs from that shown in FIG. 1 in that an upper portion of the diffuser bag 40' is formed integrally with a lower portion of the diffuser bag 30', thereby enabling a component count to be further reduced. Otherwise, the present embodiment is the same in makeup as the one embodiment shown in FIG. 1, and in FIG. 4, parts corresponding to those in FIG. 1 are denoted by like reference numerals with "'" affixed thereto.

In actual fabrication of the air bag device, if the upper portion of the diffuser bag 40' is formed integrally with the lower portion of the diffuser bag 30', it is impossible to sew them to both the front side face, and the back side face of a bag-like body of the air bag device 1. Accordingly, with the present embodiment, there is adopted a structure wherein the upper edge portion 30a' of the lower portion of the diffuser bag 30' is fitted into the upper portion of the diffuser bag 40', thereby integrating the lower portion of the diffuser bag 30' with the upper portion of the diffuser bag 40', however, the present invention includes a case where the lower portion of the diffuser bag 30' as integrated with the upper portion of the diffuser bag 40' is attached to both the front side face, and the back side face of the bag-like body of the air bag device by use of fastening means other than sewing, for example, by use of an adhesive, and so forth.

What is claimed is:

1. An air bag device comprising:
   a chest or waist protecting air chamber for protection of the chest or the waist of an occupant,
   a head protecting air chamber for protection of the head of the occupant, and
   a diffuser in a bag-like shape, interposed therebetween, having a first communicating hole and a second communicating hole for portioning out gas from an inflator to the head protecting air chamber and the chest or waist protecting air chamber, respectively,
   wherein the head protecting air chamber is provided with a head tether extending upwardly, a gap is formed between the upper edge of the head tether and the upper edge of the air bag for guiding gas jetted from the first communicating hole so as to go around from the back side of a head protection region of an air bag toward the front side thereof while the second communicating hole is formed so as to be smaller in opening area than the first communicating hole, and vent holes are formed in the chest or waist protecting air chamber.

2. An air bag comprising:
   a chest or waist protecting air chamber for protection of the chest or the waist of an occupant,
   a head protecting air chamber for protection of the head of the occupant, and
   a diffuser in a bag-like shape, interposed therebetween, having a first communicating hole and a second communicating hole for portioning out gas from an inflator to the head protecting air chamber, and the chest or waist protecting air chamber, respectively, wherein the head protecting air chamber is provided with a head tether extending upwardly, a gap is formed between the upper edge of the head tether and the upper edge of the air bag for guiding gas jetted from the first communicating hole so as to go around from the back side of a head protection region of an air bag toward the front side thereof, while the second communicating hole is formed so as to be smaller in opening area than the first communicating hole, vent holes are formed in the chest or waist protecting air chamber, and the head protecting air chamber is provided in a part of the air bag above the diffuser, and the chest or waist protecting air chamber is provided in a part of the air bag in front of the diffuser.

3. An air bag device according to claim 1 or 2, wherein the vent holes of the chest or waist protecting air chamber are provided in the vicinity of an edge of the chamber.

4. An air bag device comprising: a first air chamber for protection of the chest or the waist of an occupant,
   a second air chamber for protection of the head of the occupant, and a diffuser interposed therebetween having a first communicating hole and
   a second communicating hole for portioning out gas from an inflator to the second air chamber and the first air chamber, respectively,
   wherein the second air chamber has a first tether for guiding gas jetted from the first communicating hole of the diffuser into the second air chamber so as to go around the tether of a head protection region of an air bag from the back side thereof toward the front side thereof, and the second air chamber has a gap provided at the lower end of the first tether in the vicinity of the gas outlets, for letting a portion of the gas escape into a front part of the second air chamber, and the second air chamber is above the diffuser and the first air chamber is in front of the diffuser.

5. An air bag device according to claim 4, wherein the first tether is formed by sewing together base clothes forming the second air chamber on the top face side and rear face side thereof, respectively, wherein the first tether extends upward in the second air chamber from the first communicating hole.

6. An air bag device according to claim 4, wherein the gap for letting the portion of the gas escape into the front part of the second air chamber is formed by the first tether and a second tether formed by sewing together the base clothes forming the second air chamber on the top face side and rear face side thereof, respectively, at a position below the first tether with a predetermined interval provided therebetween.

7. An air bag device according to claim 4, wherein a second tether is provided in a shoulder protection region inside the second air chamber, such that the shoulder protection region of the air bag, at the time of expansion, is controlled to be smaller in thickness than the head protection region.

8. An air bag device according to claims 4, wherein when pressure inside the diffuser becomes lower than pressure inside the second air chamber, the first communicating hole for portioning out the gas from the inflator into the second air chamber is closed owing to a difference in pressure therebetween.

* * * * *